US009491075B2

(12) United States Patent
Lee et al.

(10) Patent No.: US 9,491,075 B2
(45) Date of Patent: Nov. 8, 2016

(54) METHOD FOR LATENCY MEASUREMENT AND APPARATUS THEREFOR

(71) Applicant: LG Electronics Inc., Seoul (KR)

(72) Inventors: Sunyoung Lee, Gyeonggi-do (KR); Sungjun Park, Gyeonggi-do (KR); Seungjune Yi, Gyeonggi-do (KR); Sunghoon Jung, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/431,783

(22) PCT Filed: Oct. 17, 2013

(86) PCT No.: PCT/KR2013/009281
§ 371 (c)(1),
(2) Date: Mar. 27, 2015

(87) PCT Pub. No.: WO2014/084499
PCT Pub. Date: Jun. 5, 2014

(65) Prior Publication Data
US 2015/0263921 A1 Sep. 17, 2015

Related U.S. Application Data

(60) Provisional application No. 61/730,963, filed on Nov. 29, 2012.

(51) Int. Cl.
*H04L 12/26* (2006.01)
*H04W 24/10* (2009.01)

(52) U.S. Cl.
CPC .......... *H04L 43/0852* (2013.01); *H04W 24/10* (2013.01)

(58) Field of Classification Search
CPC .......................... H04L 43/0852; H04W 24/10
USPC ........................................................ 370/252
See application file for complete search history.

(56) References Cited

U.S. PATENT DOCUMENTS

| 6,546,239 B1* | 4/2003 | Pazdersky | H04M 1/677 379/355.02 |
| 2003/0008653 A1* | 1/2003 | Jiang | H04W 36/02 455/436 |
| 2003/0048754 A1* | 3/2003 | Bruckman | H04L 12/2697 370/252 |
| 2006/0068747 A1* | 3/2006 | Brobston | H04B 1/30 455/324 |
| 2010/0208686 A1 | 8/2010 | Chun et al. | |
| 2011/0085460 A1 | 4/2011 | Zhang et al. | |
| 2014/0056169 A1 | 2/2014 | Jung et al. | |
| 2014/0113656 A1* | 4/2014 | Schmidt | H04W 24/10 455/456.2 |

FOREIGN PATENT DOCUMENTS

WO 2012/148205 A2 11/2012

OTHER PUBLICATIONS

International Search Report dated Jan. 28, 2014, issued by the International Search Authority in International Patent Application No. PCT/KR2013/009281.
Xiao, Weimin, "LS response of MDT UL Coverage Use Case," R1-120923, 3GPP TSG RAN WG1 Meeting #68, Dresden, Germany, Feb. 6-10, 2012.
MediaTek, "[77#24] Joint: MDT Latency Measurement," R2-121331, 3GPP TSG RAN WG2 Meeting #77bis, Jeju, Korea, Mar. 24-30, 2012.

* cited by examiner

Primary Examiner — Stephen J Clawson
(74) Attorney, Agent, or Firm — Morgan, Lewis & Bockius LLP

(57) ABSTRACT

End-to-end latency measurement scheme is discloses. In this scheme, the UE receives a request message from a network. This request message requests the UE to report transmission or reception timing information. And, the transmission or reception timing information may be for a latency measurement. Thereafter, the UE transmits the transmission or reception timing information to the network.

13 Claims, 8 Drawing Sheets

(a) contol - plane protocol stack (b) user - plane protocol stack

Uplink Latency Measurement

Downlink Latency Measurement

METHOD FOR LATENCY MEASUREMENT AND APPARATUS THEREFOR

TECHNICAL FIELD

The present invention relates to a wireless communication system, and more particularly, to methods for end-to-end latency measurement, and apparatuses for the same.

BACKGROUND ART

As an example of a wireless communication system to which the present invention is applicable, a 3rd generation partnership project (3GPP) long term evolution (LTE) communication system will be schematically described.

FIG. 1 is a schematic diagram showing a network structure of an evolved universal mobile telecommunications system (E-UMTS) as an example of a wireless communication system. The E-UMTS is an evolved form of the legacy UMTS and has been standardized in the 3GPP. In general, the E-UMTS is also called an LTE system. For details of the technical specification of the UMTS and the E-UMTS, refer to Release 7 and Release 8 of "3rd Generation Partnership Project; Technical Specification Group Radio Access Network".

Referring to FIG. 1, the E-UMTS includes a user equipment (UE), an evolved node B (eNode B or eNB), and an access gateway (AG) which is located at an end of an evolved UMTS terrestrial radio access network (E-UTRAN) and connected to an external network. The eNB may simultaneously transmit multiple data streams for a broadcast service, a multicast service and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

Accordingly, the present invention is directed to methods for end-to-end latency measurement, and apparatuses for the same that substantially obviates one or more problems due to limitations and disadvantages of the related art.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, a method for a user equipment (UE) to operate in a wireless communication system, the method comprising: receiving a request message from a network, wherein the request message requests the UE to report transmission or reception timing information, wherein the transmission or reception timing information is for a latency measurement; and transmitting the transmission or reception timing information to the network, is provided.

Here, the transmission or reception timing information of data may be transmission timing information, when the transmission or reception timing information is for an uplink latency measurement.

In this case, the UE may transmit the transmission timing information with data, and the data can be a SDU (service data unit).

The transmission timing information may inform the network of a timing on which the SDU is transmitted from a layer 2 (L2) of the UE to a layer 1 (L1) of the UE, but the transmission timing information may inform the network of a timing on which the SDU is received from a layer 3 (L3) of the UE by a layer 2 (L2) of the UE.

On the other hand, the transmission or reception timing information of data may be reception timing information, when the transmission or reception timing information is for a downlink latency measurement.

In this case, the UE may store the reception timing information of each data received from the network, and the UE may transmit the stored reception timing information of each data to the network.

Similar to the above case, the data can be a SDU (service data unit).

The reception timing information may inform the network of a timing on which the SDU is received from a layer 1 (L1) of the UE by a layer 2 (L2) of the UE, but the reception timing information may inform the network of a timing on which the SDU is transmitted to layer 3 (L3) of the UE from a layer 2 (L2) of the UE.

Preferably, the transmission or reception timing information is used in a process of MDT (Minimization of Drive Test).

In another aspect of the present invention, a method for a network to operate in a wireless communication system, the method comprising: transmitting a request message to a user equipment (UE), wherein the request message requests the UE to report transmission or reception timing information; receiving the transmission or reception timing information from the UE; and calculating a latency based on the transmission or reception timing information, is provided.

In another aspect of the present invention, a user equipment (UE) operating in a wireless communication system, the UE comprising: a receiver configured to receive a request message from a network, wherein the request message requests the UE to report transmission or reception timing information, wherein the transmission or reception timing information is for a latency measurement; a transmitter configured to transmit the transmission or reception timing information to the network; and a processor connected to the receiver and transmitter, is provided.

In still another aspect of the present invention, a network apparatus operating in a wireless communication system, the apparatus comprising: a transmitter configured to transmit a request message to a user equipment (UE), wherein the request message requests the UE to report transmission or reception timing information; a receiver configured to receive the transmission or reception timing information from the UE; and a processor connected to the transmitter and the receiver, and configured to calculate a latency based on the transmission or reception timing information, is provided.

Advantageous Effects

According to embodiments of the present invention, the network and the user equipment can efficiently transmit and receive signals in a wireless communication system.

It is to be understood that both the foregoing general description and the following detailed description of the present invention are exemplary and explanatory and are intended to provide further explanation of the invention as claimed.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE

The configuration, operation and other features of the present invention will be understood by the embodiments of the present invention described with reference to the accompanying drawings. The following embodiments are examples of applying the technical features of the present invention to a 3rd generation partnership project (3GPP) system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
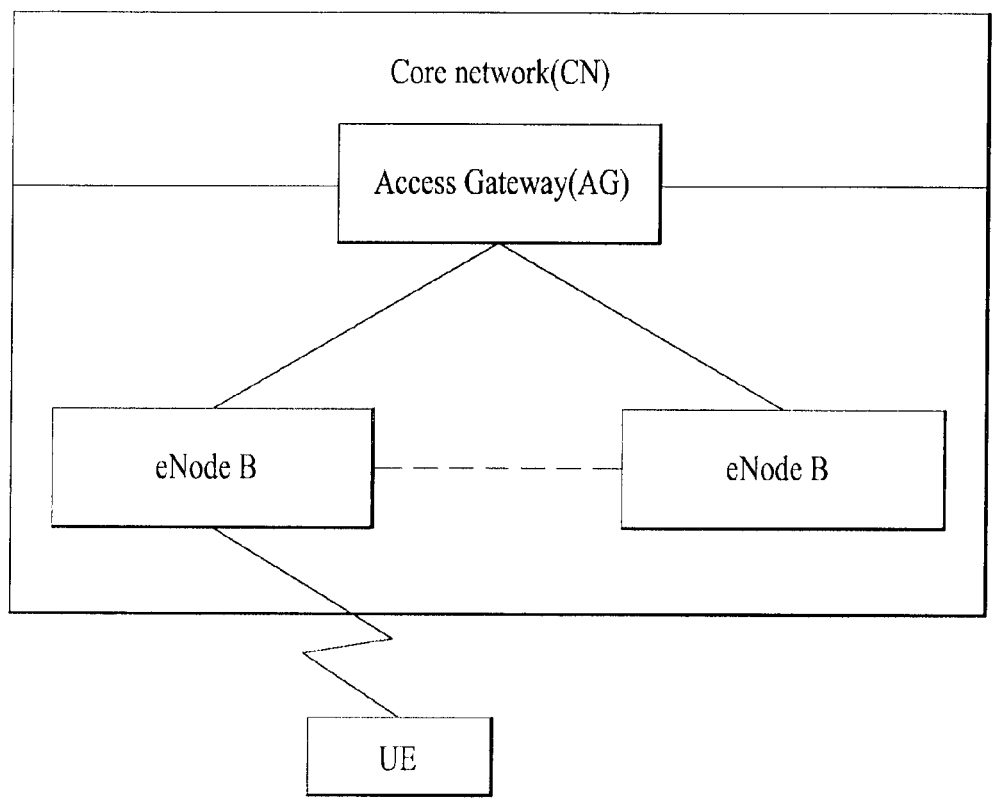
FIG. 1 is a diagram showing a network structure of an Evolved Universal Mobile Telecommunications System (E-UMTS) as an example of a wireless communication system.
Figure 2:
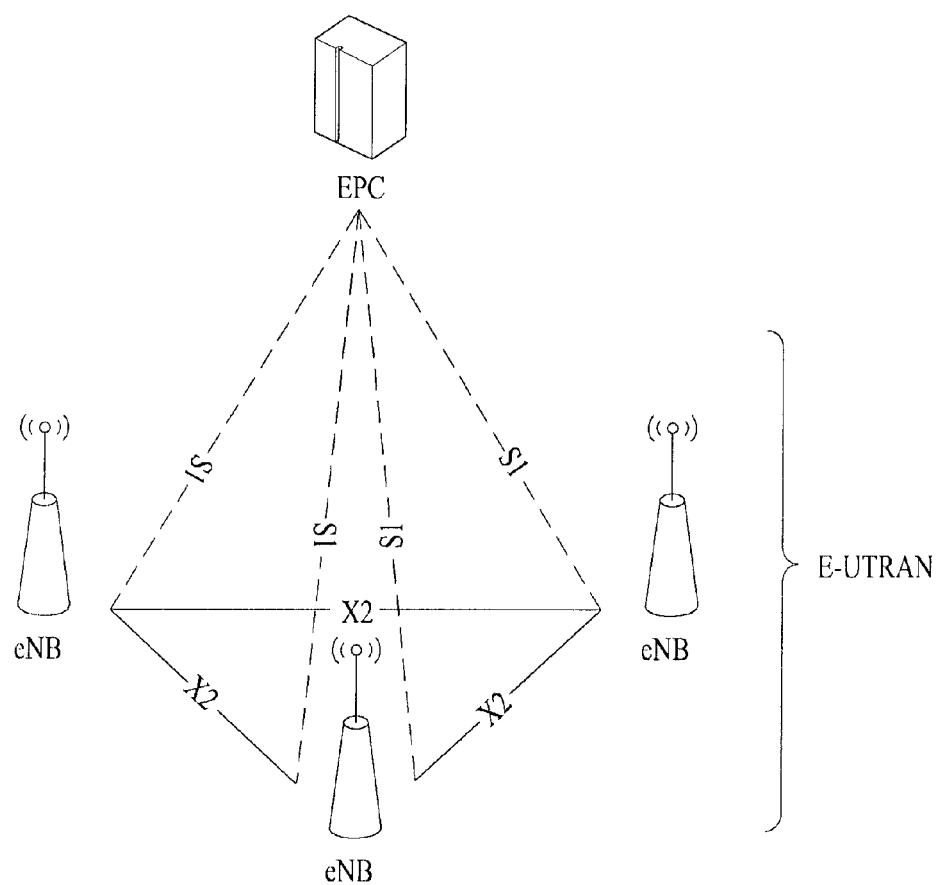
FIG. 2 is a diagram conceptually showing a network structure of an evolved universal terrestrial radio access network (E-UTRAN).

FIG. 2 is a diagram conceptually showing a network structure of an evolved universal terrestrial radio access network (E-UTRAN). An E-UTRAN system is an evolved form of a legacy UTRAN system. The E-UTRAN includes cells (eNB) which are connected to each other via an X2 interface. A cell is connected to a user equipment (UE) via a radio interface and to an evolved packet core (EPC) via an S1 interface.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
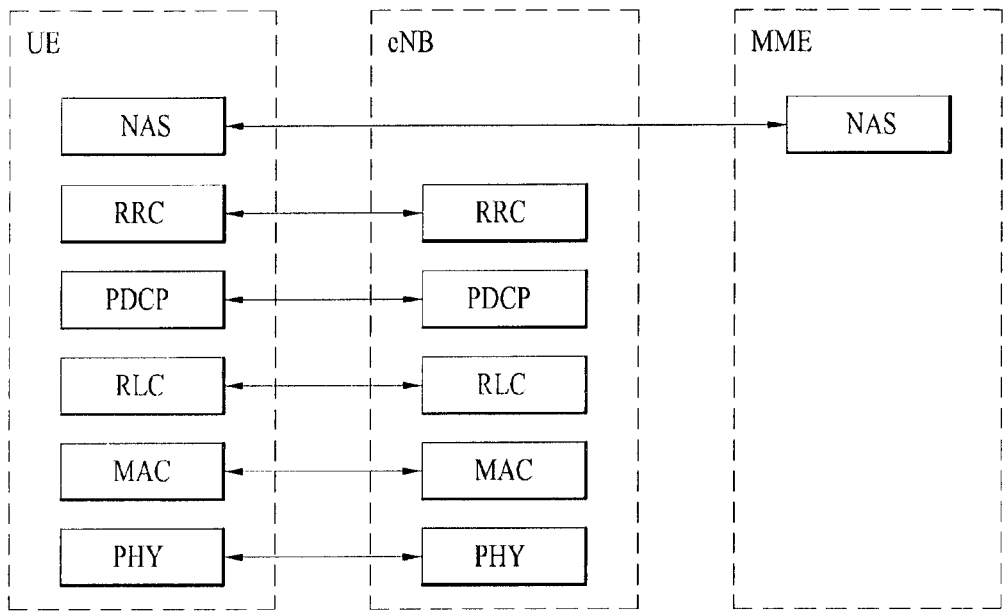
FIG. 3 is a diagram showing a control plane and a user plane of a radio interface protocol between a UE and an E-UTRAN based on a 3rd generation partnership project (3GPP) radio access network standard.
Figure 3:
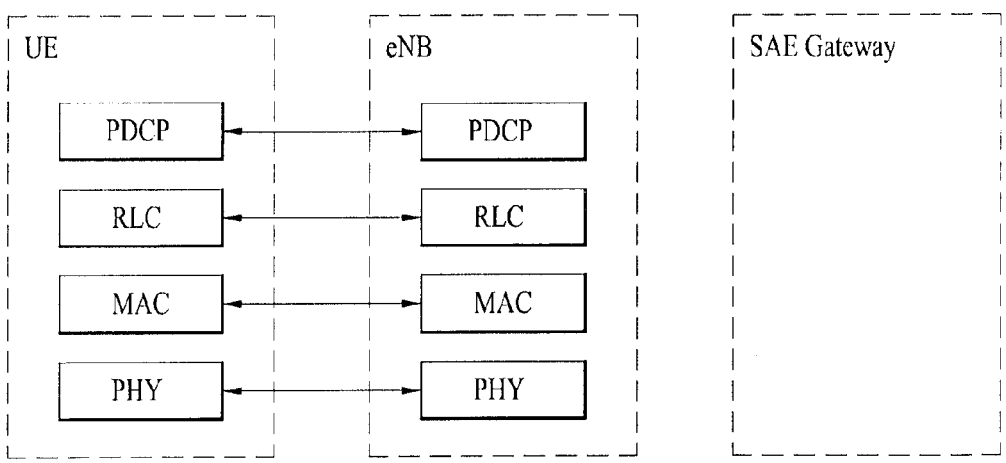

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH). Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
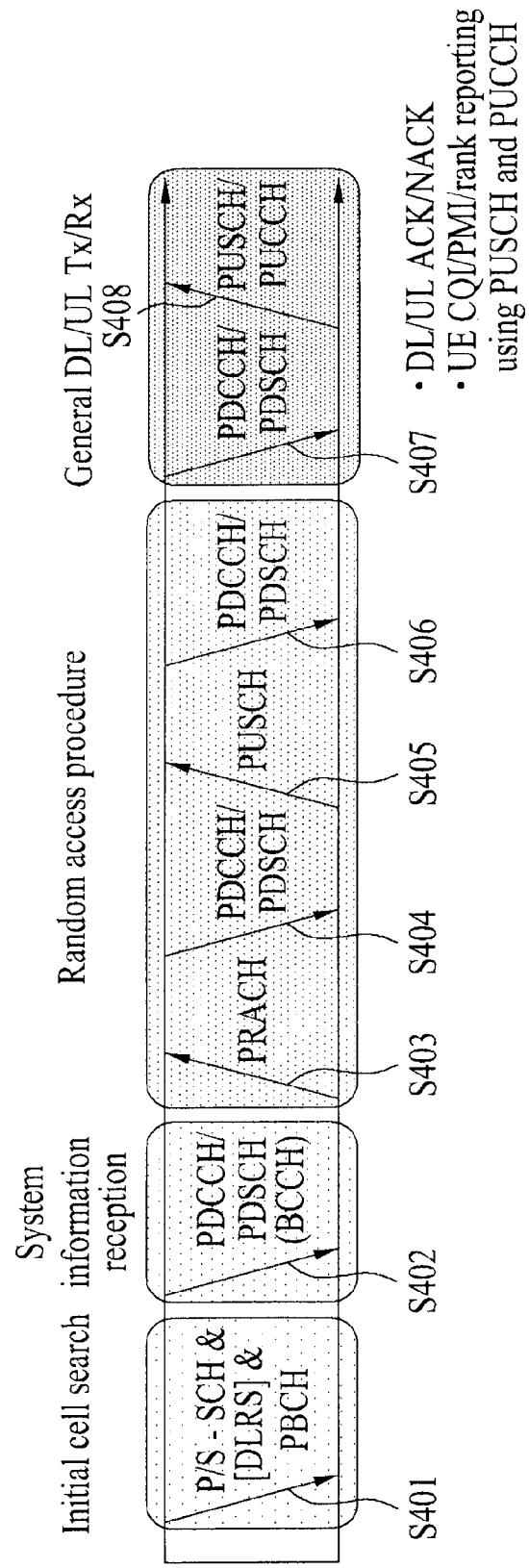
FIG. 4 is a diagram showing physical channels used in a 3GPP system and a general signal transmission method using the same.

FIG. 4 is a diagram showing physical channels used in a 3GPP system and a general signal transmission method using the same.

When a UE is powered on or enters a new cell, the UE performs an initial cell search operation such as synchronization with an eNB (S401). To this end, the UE may receive a primary synchronization channel (P-SCH) and a secondary synchronization channel (S-SCH) from the eNB to perform synchronization with the eNB and acquire information such as a cell ID. Then, the UE may receive a physical broadcast channel from the eNB to acquire broadcast information in the cell. During the initial cell search operation, the UE may receive a downlink reference signal (DL RS) so as to confirm a downlink channel state.

After the initial cell search operation, the UE may receive a physical downlink control channel (PDCCH) and a physical downlink control channel (PDSCH) based on information included in the PDCCH to acquire more detailed system information (S402).

When the UE initially accesses the eNB or has no radio resources for signal transmission, the UE may perform a random access procedure (RACH) with respect to the eNB (steps S403 to S406). To this end, the UE may transmit a specific sequence as a preamble through a physical random access channel (PRACH) (S403) and receive a response message to the preamble through the PDCCH and the PDSCH corresponding thereto (S404). In the case of contention-based RACH, the UE may further perform a contention resolution procedure.

After the above procedure, the UE may receive PDCCH/PDSCH from the eNB (S407) and may transmit a physical uplink shared channel (PUSCH)/physical uplink control channel (PUCCH) to the eNB (S408), which is a general uplink/downlink signal transmission procedure. Particularly, the UE receives downlink control information (DCI) through the PDCCH. Here, the DCI includes control information such as resource allocation information for the UE. Different DCI formats are defined according to different usages of DCI.

Control information transmitted from the UE to the eNB in uplink or transmitted from the eNB to the UE in downlink includes a downlink/uplink acknowledge/negative acknowledge (ACK/NACK) signal, a channel quality indicator (CQI), a precoding matrix index (PMI), a rank indicator (RI), and the like. In the case of the 3GPP LTE system, the UE may transmit the control information such as CQI/PMI/RI through the PUSCH and/or the PUCCH.

During data transmission, there is an unavoidable delay in the air from the transmitter to the receiver. This means that there can be a time lag between, for example, when the transmitter receives SDU from the upper layer and when the receiver receives SDU from the lower layer.

In current technical specification, since the transmitter does not log/provide any information regarding the timing of the data transmission, the network operator cannot estimate/calculate the actual latency between the transmitter and the receiver, which is experienced by the end-user.

Thus, one aspect of the present invention proposes a UE reporting transmission or reception timing information to the network. The network can calculate the end-to-end latency based on this timing information. In one embodiment, this reporting can be triggered by the request from the network. But, in another embodiment, this reporting can be configured as periodic.

Detailed examples will be explained with regards to application to MDT (Minimization of Drive-Tests). For this purpose, the concept of MDT will be introduced first.

The MDT is performed to optimize the network. The optimization can be based on a drive test in which cell measurement is performed by a moving car. But, the MDT uses the UEs within the cell to measure the quality of channel in the cell to minimize the drive test.

The general principles and requirements guiding the definition of functions for MDT are as following:

MDT Mode

There are two modes for the MDT measurements: Logged MDT and Immediate MDT.

Support of Logged MDT complies with the principles for idle mode measurements in the UE. The established principles may result in different logged information in different UEs. Furthermore, measurement logging is differentiated based on UE states in idle mode i.e. camped normally, any cell selection or camped on any cell. The UE shall perform measurement logging in "camped normally" state. In "any cell selection" and "camped on any cell" state the UE is not required to perform MDT measurement logging (including time and location information).

For Logged MDT, the configuration, measurement collection and reporting of the concerning measurement can be done in cells of the same RAT type.

Figure 5:
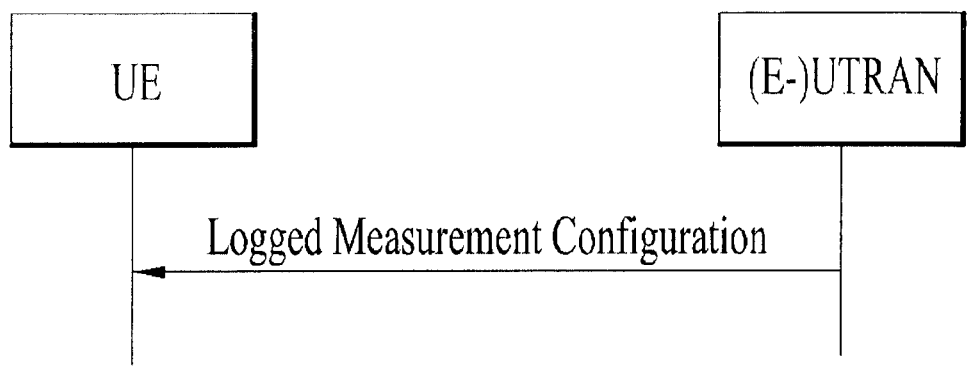
FIG. 5 shows an example of a MDT Measurement Configuration procedure

FIG. 5 shows an example of a MDT Measurement Configuration procedure.

Network may initiate the procedure to UE in RRC Connected by sending LoggedMeasurementConfiguration message, which is used to transfer configuration parameters for Logged MDT. This is a unidirectional RRC signalling procedure.

A release operation for logged measurement configuration in the UE is realized only by configuration replacement when the configuration is overwritten or by configuration clearance in case a duration timer stopping or expiration condition is met.

The logged measurement configuration comprises:

configuration of the triggering of logging events. Only periodic downlink pilot strength measurement trigger is supported, for which the logging interval is configurable. The parameter specifies the periodicity for storing MDT measurement results. It should be configured in seconds in multiples of the applied IDLE mode DRX, i.e. multiples of 1.28 s which is either a factor or multiple of the IDLE mode DRX. The UE behaviour is unspecified when the UE is configured with a DRX cycle larger than the logging interval.

configuration of the logging duration. This configuration parameter defines a timer activated at the moment of configuration, that continues independent of state changes, RAT or RPLMN change. When the timer expires the logging is stopped and the configuration is cleared (except for the parameters that are required for further reporting e.g. network absolute time stamp, trace reference, trace recording session reference and TCE Id).

network absolute time stamp to be used as a time reference to UE.

Trace Reference parameter as indicated by the OAM configuration.

Trace Recording Session Reference as indicated by the OAM configuration.

TCE Id as indicated by the OAM configuration.

(optionally) configuration of a logging area. A UE will log measurements as long as it is within the configured logging area. The scope of the logging area may consist of one of:

a list of up to 32 global cell identities. If this list is configured, the UE will only log measurements when camping in any of these cells a list of up to 8 TAs or 8 LAs or 8 RAs. If this list is configured, the UE will only log measurements when camping in any cell belonging to the preconfigured TA/LA/RAs.

If no area scope is configured, the configuration is valid in the entire MDT PLMN of the UE, i.e. the UE will log measurements throughout the MDT PLMN.

The logged measurement configuration is provided in a cell by dedicated control while UE is in CONNECTED. There is only one RAT-specific logged measurement configuration for Logged MDT in the UE. When the network provides a configuration, any previously configured logged measurement configuration will be entirely replaced by the new one. Moreover, logged measurements corresponding to the previous configuration will be cleared at the same time. It is left up to the network to retrieve any relevant data before providing a new configuration.

The logged measurement configuration is valid only in the MDT PLMN. Logged MDT measurements are performed as long as the RPLMN is the MDT PLMN. At PLMN change which results in a new RPLMN (RPLM≠MDT PLMN), the logging is suspended, i.e. the logged measurement configuration and the log are kept but measurement results are not logged.

In case the new RPLMN provides a logged measurement configuration any previously configured logged measurement configuration and corresponding log are cleared and overwritten without being retrieved.

In "camp normally" state, a UE shall perform logging as per the logged measurement configuration. This state includes a period between cell selection criteria not being met and UE entering "any cell selection" state, i.e. 10 s for E-UTRA. In "any cell selection" or "camped on any cell" state, the periodic logging stops. However, it should be noted that the duration timer is kept running. When the UE re-enters "camped normally" state and the duration timer has not expired, the periodic logging is restarted based on new DRX and logging resumes automatically (with a leap in time stamp).

The measurement quantity is fixed for Logged MDT (i.e. not configurable) and consists of both RSRP and RSRQ for EUTRA, both RSCP and Ec/No for UTRA, P-CCPCH RSCP for UTRA 1.28 TDD, Rxlev for GERAN, and Pilot Pn Phase and Pilot Strength for CDMA2000 if the serving cell is EUTRAN cell.

UE collects MDT measurements and continues logging according to the logged measurement configuration until UE memory reserved for MDT is full. In this case the UE stops logging, stops the log duration timer and starts the 48 hour timer.

A UE configured to perform Logged MDT measurements indicates the availability of Logged MDT measurements, by means of an indicator, in RRCConnectionSetupComplete message during connection establishment. Furthermore, the indicator (possibly updated) shall be provided within E-UTRAN handover and re-establishment, and UTRAN procedures involving the change of SRNC (SRNC relocation), CELL UPDATE, URA UPDATE messages as well as MEASUREMENT REPORT message in case of state transition to CELL_FACH without CELL UPDATE. The UE includes the indication in one of these messages at every transition to RRC Connected mode even though the logging period has not ended, upon connection to RAT which configured the UE to perform Logged MDT measurements and RPLMN which is equal to the MDT PLMN.

The indicator shall be also provided in UEInformationResponse message during MDT report retrieval in case the UE has not transferred the total log in one RRC message in order to indicate the remaining data availability.

The UE will not indicate the availability of MDT measurements in another RAT or in another RPLMN.

The network may decide to retrieve the logged measurements based on this indication. In case Logged MDT measurements are retrieved before the completion of the predefined logging duration, the reported measurement results are deleted, but MDT measurement logging will continue according to ongoing logged measurement configuration.

In case the network does not retrieve Logged MDT measurements, UE should store non-retrieved measurements for 48 hours from the moment the duration timer for logging expired. There is no requirement to store non-retrieved data beyond 48 hours. In addition, all logged measurement configuration and the log shall be removed by the UE at switch off or detach.

For Logged MDT the measurement reporting is triggered by an on-demand mechanism, i.e. the UE is asked by the network to send the collected measurement logs via RRC signalling. UE Information a specific procedure is used to request UE to send the collected measurement logs. The reporting may occur in different cells than which the logged measurement configuration is signalled.

Transport of Logged MDT reports in multiple RRC messages is supported. With every request, the network may receive a part of the total UE log. To indicate the reported data is a segment, the UE shall include a specific data availability indicator. In multiple RRC transmissions for segmented Logged MDT reporting, FIFO order is followed, i.e. the UE should provide oldest available measurement entries in earliest message. There is no requirement specified on the size of particular reporting parts. However, each reported part should be "self-decodable", i.e. interpretable even in case all the other parts are not available.

Logged MDT measurements can be retrieved only if the RPLMN is the MDT PLMN. The UE shall send an empty report when retrieval is attempted in other cases. The logged measurement report consists of measurement results for the serving cell (the measurement quantity), available UE measurements performed in idle for intra-frequency/inter-frequency/inter-RAT, time stamp and location information.

The number of neighbouring cells to be logged is limited by a fixed upper limit per frequency for each category below.

For any logged cell (serving or neighbour), latest available measurement result made for cell reselection purposes is included in the log only if it has not already been reported.

While logging neighbour cells measurements, the UE shall determine a fixed number of best cells based on the measurement quantity used for ranking during cell reselection per frequency or RAT.

The measurement report is self contained, i.e. the RAN node is able to interpret the Logged MDT reporting results even if it does not have access to the logged measurement configuration. Each measurement report also contains the necessary parameters for the network to be able to route the reports to the correct TCE and for OAM to identify what is reported. The parameters are sent to the UE in the logged configuration message.

For each MDT measurement the UE includes a relative time stamp. The base unit for time information in the Logged MDT reports is the second. In the log, the time stamp indicates the point in time when periodic logging timer expires. The time stamp is counted in seconds from the moment the logged measurement configuration is received at the UE, relative to the absolute time stamp received within the configuration. The absolute time stamp is the current network time at the point when Logged MDT is configured to the UE. The UE echoes back this absolute reference time. The time format for Logged MDT report is: YY-MM-DD HH:MM:SS.

Location information is based on available location information in the UE. Thus, the Logged MDT measurements are tagged by the UE with location data in the following manner:
  ECGI or Cell-Id of the serving cell when the measurement was taken is always included in E-UTRAN or UTRAN respectively
  Detailed location information (e.g. GNSS location information) is included if available in the UE when the measurement was taken. If detailed location information is available the reporting shall consist of latitude and longitude. Depending on availability, altitude may be also additionally included. UE tags available detailed location information only once with upcoming measurement sample, and then the detailed location information is discarded, i.e. the validity of detailed location information is implicitly assumed to be one logging interval.

The neighbour cell measurement information that is provided by the UE may be used to determine the UE location (RF fingerprint).

Depending on location information, measurement log/report may comprises:
  time information, RF measurements, RF fingerprints, or
  time information, RF measurements, detailed location information (e.g. GNSS location information)

Hereinafter, immediate MDT is explained.

For Immediate MDT, the configuration is based on the existing RRC measurement procedures for configuration and reporting with some extensions for location information.

No extensions related to time stamp are expected for Immediate MDT i.e. time stamp is expected to be provided by eNB/RNC. No MDT specific support has been provided for initiation of positioning.

If area scope is included in the MDT configuration provided to the eNB, the UE is configured with respective measurement when the UE is connected to a cell that is part of the configured area scope.

For Immediate MDT, measurement results should provide detailed location information (e.g. GNSS location information) if available. The UE can also provide neighbour cell measurement information that may be used to determine the UE location (RF fingerprint). ECGI or Cell-Id of the serving cell when the measurement was taken is always assumed known in E-UTRAN or UTRAN respectively.

The QoS verification is considered in Rel-11 with the following aspects:
  Usage of UE specific QoS measurements to verify performance relevant to end user perception. This also allows detecting critical conditions and determining the need to change the network configuration, parameter settings or capacity extension.
  Usage of UE location information to do a QoS benchmarking geographical map.
  Correlation of UE specific QoS measurements with other available information, e.g. link adaptation information, for root cause analysis to find critical factors determining observed QoS.
  In particular, throughput QoS measurement shall be taken into account, and other QoS related measurements can be considered.
  It should be taken into account user-perceived non-availability of connection, e.g. at lack of coverage, frequent connection recovery or frequent handover. The actual coverage is assumed to be verified primarily with other (than QoS) measurements defined for coverage optimization use case.
  QoS related measurement and logging performed in the UE will be considered unless the same level of enhancement can be obtained, on a case-by-case basis, by measurements and logging in UTRAN/E-UTRAN.

As stated above, the current technology does not provide means for measuring the delay in the air from the transmitter to the receiver. This may limits the efficiencies of the above explained MDT. Thus, one embodiment of the present invention is directed to provide means for measuring the latency delay in the air. This may be used in terms of MDT, but it shall not be limited to this example.

In this embodiment, in order to provide the network operators with the actual latency information in the air, the UE may set the timing information of the transmitted/received data and may report to the eNB along with the data to be transmitted. The timing information may indicate the time, e.g., when the Layer 2 of the UE receives the data from the upper layer (for transmission timing), when the Layer 2 of the UE submits the data to the lower layer (for transmission timing), when the Layer 2 of the UE, receives the data from the lower layer (for reception timing), or when the Layer 2 of the UE transmits the data to the upper layer (for reception timing).

In the eNB side, the eNB may send an indication which triggers timing information to the UE, or configures the UE to report transmitting/receiving timing information for UL/DL latency measurement.

The below is for explaining the above scheme specifically to UL latency measurement and DL latency measurement.

UL Latency Measurement

For UL latency measurement, the UE may send the transmission timing information (txTimingInfo) to the eNB, which indicates the time when the data is transmitted from the UE side. This can be one of (a) when the Layer 2 of the UE receives the data from the upper layer, and (b) when the Layer 2 of the UE submits the data to the lower layer.

When the eNB receives the data, the eNB can estimate/calculate the delay from the UE to the eNB based on the reception time and the txTimingInfo.

The UE may send the txTimingInfo as configured by the eNB or upon the request from the eNB. The configuration or request can be received as a form of MAC/RLC/PDCP/RRC signalling. For MAC/RLC/PDCP signalling, a new control PDU may be defined, and for RRC signaling, a new RRC message or a new RRC information element may be defined. If the UE is configured to send the txTimingInfo upon the request from the eNB, the UE may send the txTimingInfo only once for the received request, or the UE may keep sending the txTimingInfo until the STOP command is received from the eNB.

The STOP command can also be received as a form of MAC/RLC/PDCP/RRC signaling. A single command may be used to start/stop of UE's sending txTimingInfo. The request command may include the duration of the time during which the UE keeps sending the txTimingInfo. The time duration can be defined as absolute time duration, the number of subframes, or the number of SDU/PDUs. Also, the request command may include the periodicity of sending txTimingInfo. The periodicity can be defined as absolute time duration, the number of subframes, or the number of SDU/PDUs.

As stated above, the UE may set the txTimingInfo to the time when the PDCP/RLC/MAC of the transmitter receives SDU from the upper layer, or to the time when the PDCP/RLC/MAC of the transmitter submits the SDU to the lower layer.

The UE may include the txTimingInfo in the data PDU of PDCP/RLC/MAC. In this case, the txTimingInfo is included in the same PDU together with the corresponding SDU. The txTimingInfo may be included for each SDU, or only once per PDU. An indicator may be included in the data PDU to indicate whether the txTimingInfo is included in the PDU. One of Reserved bit may be used for this purpose. Another method is to define a new PDU format including the txTimingInfo field, and whether to use the new PDU format is configured by the eNB. In this case, the indicator is not included in the PDU.

Alternatively, the UE may include the txTimingInfo in the control PDU of PDCP/RLC/MAC. In this case, the txTimingInfo is included in the different PDU than the corresponding SDU, and the UE sends the control PDU right before or after the data PDU containing the corresponding SDU to make the eNB to know the transmission time of the corresponding SDU. In another method, a Sequence Number of the corresponding SDU is included in the control PDU together with the txTimingInfo. For the control PDU type identification, a new value of control PDU type indicator (e.g. "Control PDU Type" or "LCID" field) is defined for txTimingInfo.

The txTimingInfo could be an absolute timing information, e.g., hour, minute, and also second information, based on the UE-equipped clock. Alternatively, the txTimingInfo could be a SFN (System Frame Number) or subframe number.

DL Latency Measurement

For DL latency measurement, same behavior as described in UL case can be applied to the UE and the eNB, only switching the role between them. But one additional behavior needs to be defined on how the UE reports the estimated/calculated delay to the eNB.

The UE may report the estimated/calculated delay to the eNB with the parameter TimeDelay.

The UE reports the TimeDelay; (1) at the configured time, in this case the eNB may configure the UE to report the TimeDelay periodically; or (2) upon request from the eNB, in this case a reception of a txTimingInfo may trigger the UE to report the TimeDelay and a new control PDU is introduced for the eNB to request the TimeDelay from the UE.

For the request of TimeDelay reporting; the UE may report the TimeDelay only once for the received request. The UE may keep reporting the TimeDelay until STOP command is received from the eNB. The UE may keep reporting the TimeDelay for the time duration indicated in the request signaling.

The TimeDelay may be calculated based on txTimingInfo of; (a) each SDU or PDU, (b) multiple SDUs or PDUs in a single RB, (c) multiple SDUs or PDUs from multiple RBs with same QCI (QoS Class Identifier) or same LCG (Logical Channel Group), (d) multiple SDUs or PDUs in a UE, or (e) multiple SDUs or PDUs within certain duration of window.

The window may be pre-defined or configured by MAC/RLC/PDCP/RRC signalling. The duration of window can be defined by; (a) the time duration, (b) the number of subframes, or (c) the number of SDU/PDUs.

The window may be applied; per RB, per QCI (i.e. RBs of the same QCI), or per UE (i.e. all RBs of the UE).

When the TimeDelay is calculated based on multiple txTimingInfos, the UE may calculate the TimeDelay as; (1) the longest value of time delay among the time delays calculated using multiple txTimingInfos, (2) the shortest value of time delay among the time delays calculated using multiple txTimingInfos, or (3) the average value of time delay of the time delays calculated using multiple txTimingInfos.

The UE may report the TimeDelay together with; Sequence Number of corresponding SDU or PDU, RB ID of corresponding RB, QCI (QoS Class Identifier) of corresponding RB, or LCG (Logical Channel Group) ID of corresponding RB.

The UE may report the TimeDelay via; PDCP/RLC/MAC control PDU, PDCP/RLC/MAC data PDU(s), or RRC signaling.

In another embodiment, the UE does not report the estimated/calculated delay but report the reception time to the eNB with the parameter rxTimingInfo. In this method, the eNB may not send the txTimingInfo.

The UE may set the rxTimingInfo to the time; when the PDCP/RLC/MAC of the receiver receives the PDU from the lower layer, or when the PDCP/RLC/MAC of the receiver delivers the SDU to the upper layer.

The UE may report the rxTimingInfo; (1) at the configured time, in this case the eNB may configure the UE to report the rxTimingInfo periodically, or (2) upon request from the eNB, in this case, a reception of an indicator may trigger the UE to report the rxTimingInfo.

A new control PDU may be introduced for the eNB to request the rxTimingInfo from the UE, which may include: the duration of the time during which the UE keeps sending the rxTimingInfo, the duration is defined as absolute time duration, the number of subframes, or the number of SDU/PDUs, the periodicity which indicates how many rxTimingInfos will be reported. The periodicity can be defined as absolute time duration, the number of subframes, or the number of received txTimingInfos.

For the request of rxTimingInfo reporting, the UE may report the rxTimingInfo only once for the received request. The UE may keep reporting the rxTimingInfo until STOP command is received from the eNB. The UE may keep reporting the rxTimingInfo for the time duration indicated in the request signaling.

The UE may report the rxTimingInfo together with; Sequence Number of corresponding SDU or PDU, RB ID of corresponding RB, QCI (QoS Class Identifier) of corresponding RB, and/or LCG (Logical Channel Group) ID of corresponding RB.

The UE may report the rxTimingInfo via PDCP/RLC/MAC control PDU, PDCP/RLC/MAC data PDU(s), or RRC signaling.

The UE may gather rxTimingInfo for multiple SDU/PDUs, and reports them together in one message/command. The reporting message/command includes the list of rxTimingInfo.

Figure 6:
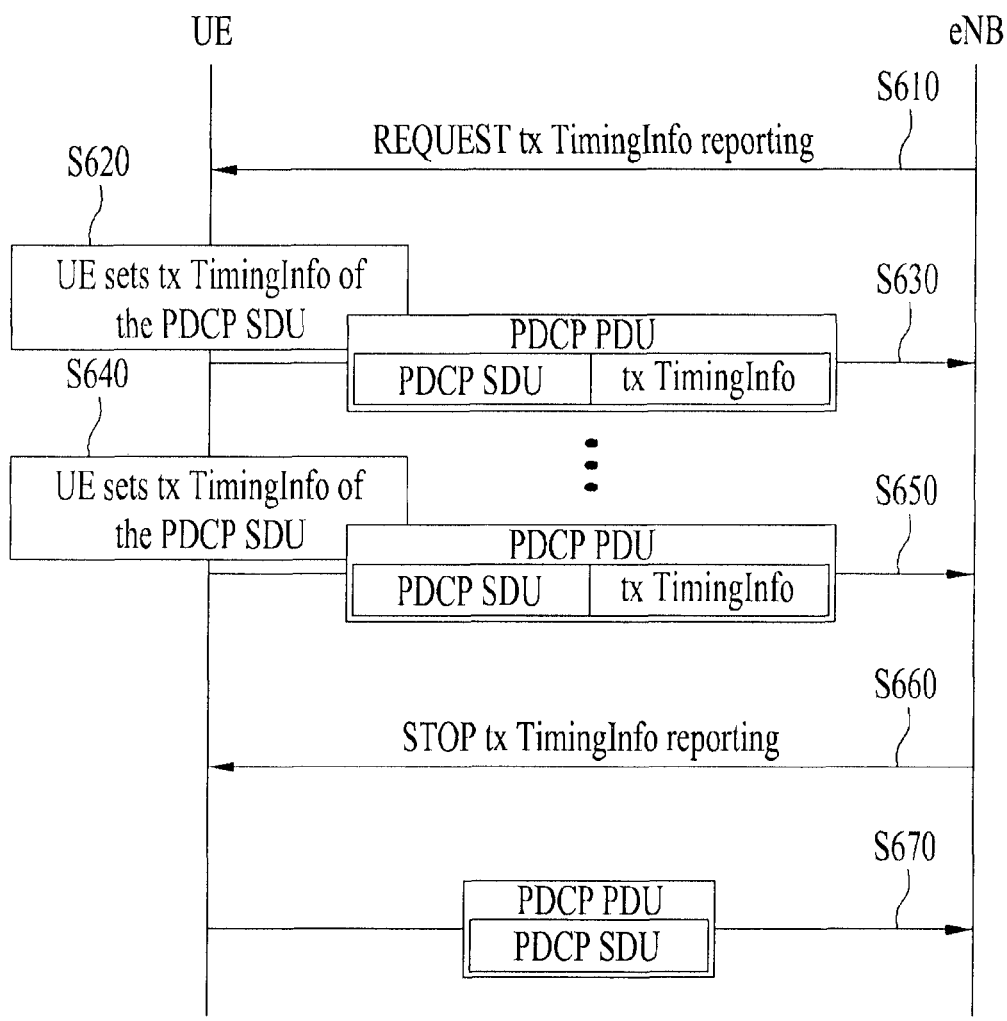
FIG. 6 shows one example of uplink latency measurement according to the present embodiment.

FIG. 6 shows one example of uplink latency measurement according to the present embodiment.

At S610, the eNB may request that the UE reports txTimingInfo to the eNB using the request command. At S620, the UE may set txTimingInfo of the PDCP SDU. This txTimingInfo can be either (a) a timing when the Layer 2 of the UE receives the data from the upper layer, or (b) a timing when the Layer 2 of the UE submits the data to the lower layer. Thereafter, the UE may report it to the eNB as configured by the request command (S630).

This transmission of txTimingInfo can be repeated as stated above (S640 and S650).

When the UE receives STOP command from the eNB (S660), the UE does not report txTimingInfo anymore. For example, the UE may transmits PDCP SDU without txTimingInfo (S670).

Figure 7:
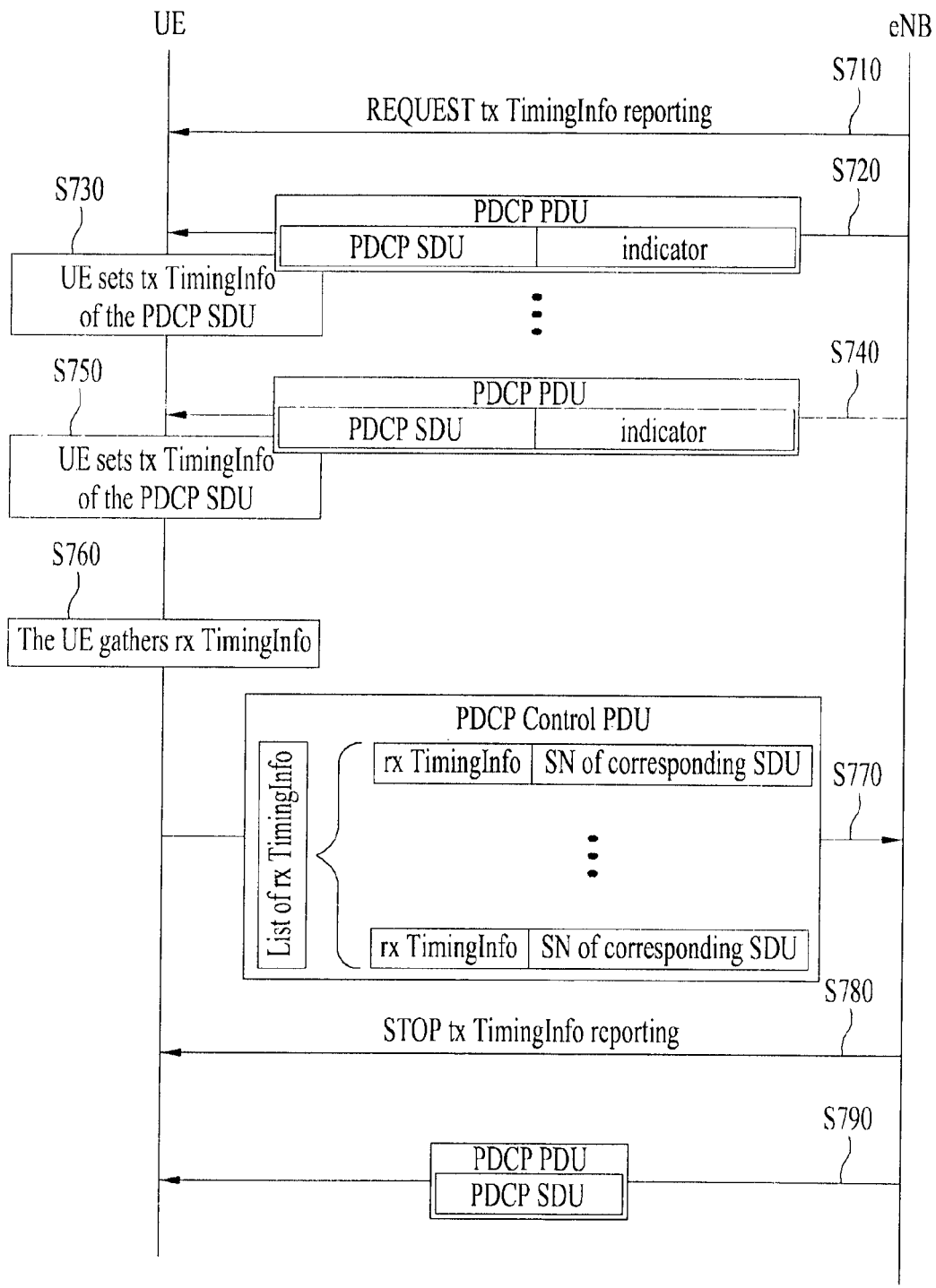
FIG. 7 shows one example of downlink latency measurement according to the present embodiment.

FIG. 7 shows one example of downlink latency measurement according to the present embodiment.

The eNB may request that the UE reports a reception timing information (rxTimingInfo) to the eNB using the request command (S710). When the UE receives data from the network (S720), the UE may set rxTimingInfo of the PDCP SDU during the time duration indicated by the request command (S730). As stated above, the rxTimingInfo may be either (1) a timing when the Layer 2 of the UE receives the data from the lower layer, or (2) a timing when the Layer 2 of the UE transmits the data to the upper layer. These steps may be repeated (S740, S750).

The UE may gather multiple rxTimingInfos and generates a list of rxTimingInfos (S760), where the number of rxTimingInfos in the list is indicated by the request command. The UE may report rxTimingInfos to the eNB as a list of rxTimingInfos in a PDCP PDU (S770). The UE keeps reporting the rxTimingInfos as a form of list in a PDCP PDU until the UE receives STOP command from the eNB (S780). After that, the UE no longer gather the rxTimingInfos when receiving data from the eNB (S790).

Figure 8:
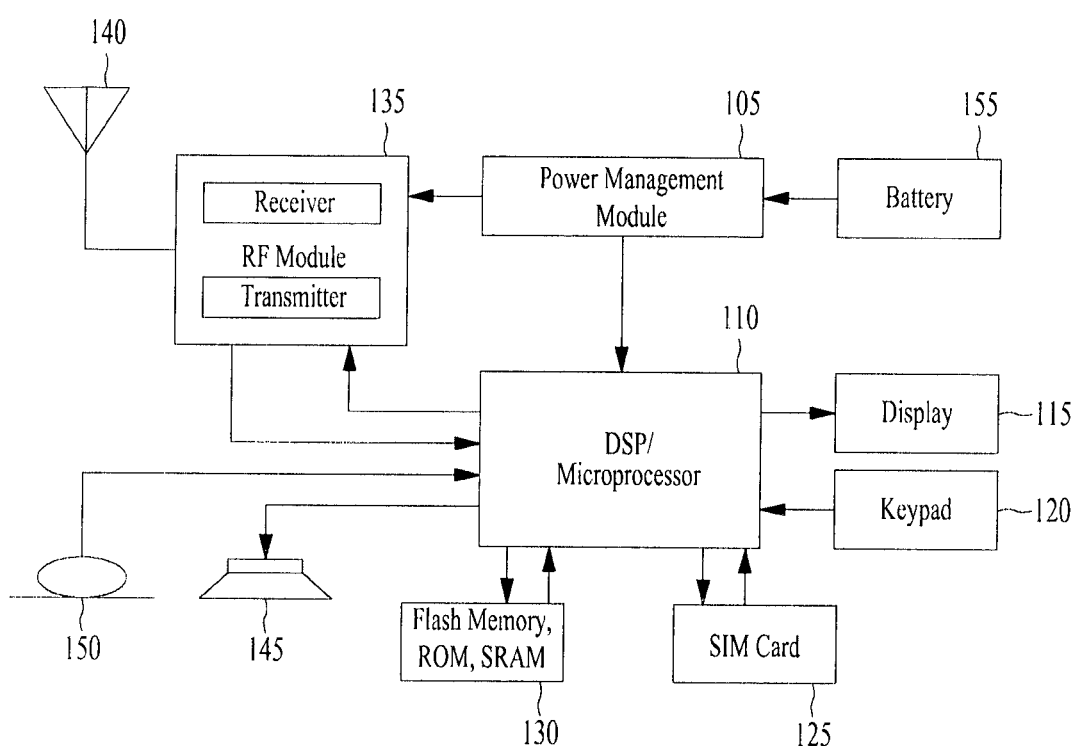
FIG. 8 is a block diagram of a communication apparatus according to an embodiment of the present invention.

FIG. 8 is a block diagram of a communication apparatus according to an embodiment of the present invention.

The apparatus shown in FIG. 8 can be a user equipment (UE) and/or eNB adapted to perform the above mechanism, but it can be any apparatus for performing the same operation.

As shown in FIG. 8, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 8 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 8 may represent a network apparatus comprising a transmitter (135) configured to transmit a request message to a UE and a receiver (135) configured to receive the transmission or reception timing information from the UE. These transmitter and receiver may constitutes the transceiver (135). The network further comprises a processor (110) connected to the transmitter and the receiver. This processor (110) may be configured to calculate a latency based on the transmission or reception timing information.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a user equipment (UE) including a receiver, a transmitter, and a processor, to operate in a wireless communication system, the method comprising:
receiving, by the receiver, a request message from a network, wherein the request message requests the UE to report transmission or reception timing information, the processor having an architecture comprising a layer 1 (L1) corresponding to a PHY (physical) layer, a layer 2 (L2) corresponding to a MAC (medium access control) layer, and a layer 3 (L3) corresponding to an RRC (Radio Resource Control) layer, the transmission or reception timing information being timing information on which a data unit is transmitted or received by the layer 2 of the processor to or from another layer of the processor; and
transmitting, by the transmitter, a wireless signal including the transmission or reception timing information to the network through a radio resource.

2. The method of claim 1, wherein the transmission or reception timing information of the data unit is transmission timing information when the transmission or reception timing information is used for an uplink latency measurement.

3. The method of claim 2, wherein the UE transmits the transmission timing information with user data other than the transmission timing information.

4. The method of claim 3, wherein the user data is an SDU (service data unit).

5. The method of claim 4, wherein the transmission timing information informs the network of a timing on which the SDU is transmitted from the layer 2 (L2) to the layer 1 (L1).

6. The method of claim 4, wherein the transmission timing information informs the network of a timing on which the SDU is received from the layer 3 (L3) to the layer 2 (L2).

7. The method of claim 1, wherein the transmission or reception timing information of the data unit is reception timing information when the transmission or reception timing information is used for a downlink latency measurement.

8. The method of claim 7, wherein:
the UE stores the reception timing information; and
wherein the UE transmits the stored reception timing information to the network.

9. The method of claim 8, wherein the data unit is an SDU (service data unit).

10. The method of claim 9, wherein the reception timing information informs the network of a timing on which the SDU is received from the layer 2 (L2) to the layer 1 (L1).

11. The method of claim 9, wherein the reception timing information informs the network of a timing on which the SDU is transmitted to the layer 3 (L3) to the layer 2 (L2).

12. The method of claim 1, wherein the transmission or reception timing information is used in a process of MDT (Minimization of Drive Test).

13. A user equipment (UE) operating in a wireless communication system, the UE comprising:
a processor having an architecture comprising:
a layer 1 (L1) corresponding to a PHY (physical) layer;
a layer 2 (L2) corresponding to a MAC (medium access control) layer; and
a layer 3 (L3) corresponding to an RRC (Radio Resource Control) layer;
a receiver configured to receive a request message from a network, the request message requesting the UE to report transmission or reception timing information, the transmission or reception timing information being timing information on which a data unit is transmitted or received by the layer 2 of the processor to or from another layer of the processor; and
a transmitter configured to transmit a wireless signal including the transmission or reception timing information to the network.

* * * * *